United States Patent
Kwon et al.

(10) Patent No.: US 9,512,009 B2
(45) Date of Patent: Dec. 6, 2016

(54) ORGANIC-INORGANIC SILICA PARTICLES, METHOD OF PREPARING THE SAME, AND HARD COATING COMPOSITION CONTAINING THE SAME

(75) Inventors: Dongjoo Kwon, Daejeon (KR); Won-Kook Kim, Daejeon (KR); Yanggu Kang, Daejeon (KR)

(73) Assignee: LG HAUSYS, LTD., Seoul (KR)

( * ) Notice: Subject to any disclaimer, the term of this patent is extended or adjusted under 35 U.S.C. 154(b) by 259 days.

(21) Appl. No.: 13/388,501

(22) PCT Filed: Aug. 31, 2010

(86) PCT No.: PCT/KR2010/005871
§ 371 (c)(1),
(2), (4) Date: Feb. 2, 2012

(87) PCT Pub. No.: WO2011/037332
PCT Pub. Date: Mar. 31, 2011

(65) Prior Publication Data
US 2012/0135216 A1    May 31, 2012

(30) Foreign Application Priority Data
Sep. 22, 2009 (KR) .................. 10-2009-0089655

(51) Int. Cl.
*B32B 5/00* (2006.01)
*C01B 33/149* (2006.01)
(Continued)

(52) U.S. Cl.
CPC .............. *C01B 33/149* (2013.01); *B82Y 30/00* (2013.01); *C01B 33/12* (2013.01); *C08G 18/3895* (2013.01); *C08G 18/6225* (2013.01); *C08G 18/792* (2013.01); *C09D 133/08* (2013.01); *C09D 143/04* (2013.01); *C09D 175/14* (2013.01); *C01P 2002/82* (2013.01);
(Continued)

(58) Field of Classification Search
None
See application file for complete search history.

(56) References Cited

U.S. PATENT DOCUMENTS

| 7,060,737 B2 * | 6/2006 | Yamaguchi ............... B32B 5/00 428/323 |
| 2007/0102110 A1 * | 5/2007 | Yuba et al. ................. 156/285 |
| 2007/0237966 A1 * | 10/2007 | Takao ..................... C08J 7/047 428/423.1 |

FOREIGN PATENT DOCUMENTS

| JP | 05-287213 A | 11/1993 |
| JP | 05-295052 A | 11/1993 |

(Continued)

OTHER PUBLICATIONS
Machine Translation KR 20080062355 (2008).*
(Continued)

*Primary Examiner* — Alexandre Ferre
(74) *Attorney, Agent, or Firm* — Nath, Goldberg & Meyer; Joshua B. Goldberg; Scott H. Blackman

(57) ABSTRACT

The present invention relates to novel organic-inorganic silica particles, a preparation method thereof, and a hard coating composition containing the same, and more specifically, to organic-inorganic silica particles wherein an initiator is chemically bonded to hydroxyl groups (—OH) on the surface of the silica particles, a preparation method thereof, and a hard coating composition containing the same. A hard coating film with excellent abrasion resistance, scratch resistance and the like can be prepared by using the hard coating composition containing the organic-inorganic silica particles according to the present invention.

8 Claims, 1 Drawing Sheet

(51) Int. Cl.

| | | |
|---|---|---|
| | *C09D 175/14* | (2006.01) |
| | *C09D 133/08* | (2006.01) |
| | *B82Y 30/00* | (2011.01) |
| | *C01B 33/12* | (2006.01) |
| | *C09D 143/04* | (2006.01) |
| | *C08G 18/62* | (2006.01) |
| | *C08G 18/79* | (2006.01) |
| | *C08G 18/38* | (2006.01) |

(52) U.S. Cl.
 CPC ........ *C01P2004/62* (2013.01); *C01P 2004/64* (2013.01); *Y10T 428/2982* (2015.01)

(56) References Cited

FOREIGN PATENT DOCUMENTS

| JP | 10176007 A | * | 6/1998 |
|---|---|---|---|
| KR | 10-2008-0062355 A | | 7/2008 |
| KR | 20080062355 | * | 7/2008 |

OTHER PUBLICATIONS

Machine translation JP10-176007 (1998).*

Tsubokawa, N., et al. "Graft Polymerization of Vinyl Monomers from Inogranic Utrafine Particles Initiated by Azo Groups Introduced onto the Surface", Polymer Journal, vol. 22, No. 9, pp. 827-833, (1990).

German Patent Application No. 11 2010 003 739.6, Office Action dated Jul. 19, 2013, five (5) pages.

Huls AG, "Anwendugen Von Organofunktionellen Silanen, Dynasylan", Jul. 1994, pp. 1-69, Partial English Translation attached.

* cited by examiner

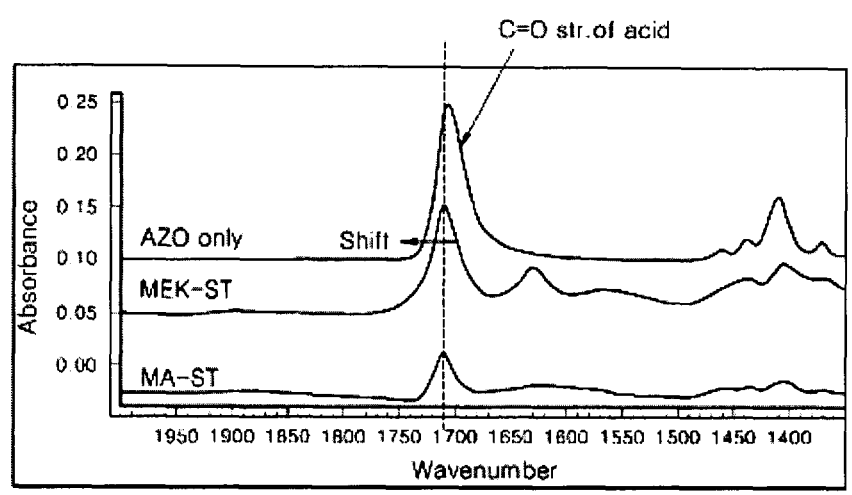

ORGANIC-INORGANIC SILICA PARTICLES, METHOD OF PREPARING THE SAME, AND HARD COATING COMPOSITION CONTAINING THE SAME

This is a National Phase Application filed under 35 U.S.C. 371 as a national stage of PCT/KR2010/005871, filed Aug. 31, 2010, and claims priority benefit from Korean Application No. 10-2009-0089655, filed Sep. 22, 2009, the content of each of which is hereby incorporated by reference in its entirety.

TECHNICAL FIELD

The present invention relates to novel organic-inorganic silica particles which form a hard coating film having excellent abrasion resistance and scratch resistance, a method of preparing the same, and a hard coating composition including the same.

BACKGROUND ART

As a conventional method of forming a surface protective sheet on the surface of a molded particle, insert molding is used in which a surface protective sheet including a hard coating layer formed on one side of a base sheet and an adhesive layer formed on the other side thereof is inserted into a mold and a resin is injected into an empty space in the mold and cooled, thereby producing a resin molded article and simultaneously attaching the surface protective sheet to the surface of the molded article. Generally, a thermosetting resin or active energy ray-curable resin is used as the resin to form the hard coating layer of the surface protective sheet.

In manufacture of a surface protective sheet, when a thermosetting resin is used for a hard coating layer and is cured by heating, a molded article generally has low chemical resistance and abrasion resistance on the surface thereof. On the other hand, when an active energy ray-curable resin is used for a hard coating layer and is cured, crosslinking density of the resin increases, thereby improving chemical resistance and abrasion resistance. However, cracking occurs at a portion of the hard coating layer disposed on a curved part of the molded article in bonding.

When UV curable acrylic hard coating materials, such as polyester, acrylate, urethane acrylate, and epoxy acrylate, which are organic materials, are used alone to form a hard coating film, the hard coating film does not have sufficient surface protective properties. Thus, various organic-inorganic coating solutions containing an inorganic material, e.g., colloidal silica particles, have been used for a hard coating film to improve hardness and abrasion resistance.

However, such a hard coating film suffers precipitation of colloidal silica particles modified with organic materials or silane on the surface thereof and still has unsatisfactory properties in terms of stability related to generation of gel, curing degree, optical transparency, and adhesion.

Further, a hard coating composition for a conventional in-mold decorative film requires flexibility for curvature-molding of injection molding, whereas the surface of a final product needs higher film strength. However, a hard coating layer will suffer from a loss of strength in order to satisfy such opposite properties.

Thus, there is a need for development of a hard coating composition having not only high elongation but also excellent strength of a coating film.

DISCLOSURE

Technical Problem

The present invention is directed to solving problems of the related art and provides novel organic-inorganic silica particles which form a hard coating film having good appearance and excellent abrasion resistance and scratch resistance, a method of preparing the same, and a hard coating composition containing the same.

Technical Solution

In accordance with an aspect of the present invention, there is provided organic-inorganic silica particles in which an initiator is chemically bonded to hydroxyl (OH) groups on the surfaces of the silica particles.

In accordance with another aspect of the present invention, a method of manufacturing organic-inorganic silica particles includes: sol-gel reacting an alkoxy silane compound with a hydroxyl (OH) group on surfaces of silica particles to introduce an epoxy group into the silica particles; and reacting an initiator with the epoxy group of the silica particles.

In accordance with a further aspect of the present invention, a hard coating composition including the organic-inorganic silica particles is provided.

In accordance with yet another aspect of the present invention, a hard coating film including the organic-inorganic silica particles is provided.

In accordance with yet another aspect of the present invention, a molded article including the hard coating film is provided.

Advantageous Effects

A hard coating composition including organic-inorganic silica particles according to embodiments of the present invention may form a hard coating film having superior scratch resistance and abrasion resistance to a conventional hard coating film for in-mold decoration.

DESCRIPTION OF DRAWING

FIG. 1 illustrates FT-IR analysis results of azo-silica prepared in Example 1 according to the present invention.

MODE FOR INVENTION

Hereinafter, the present invention will be explained in more detail.

In organic-inorganic silica particles according to the present invention, an initiator is chemically bonded to hydroxyl (OH) groups on surfaces of the silica particles.

In application of the organic-inorganic silica particles to a hard coating composition, when the hard coating composition is UV- or heat-cured, the organic-inorganic silica particles and a binder resin may be chemically bonded due to introduction of the initiator into the hydroxyl group on the surfaces of the silica particles. Accordingly, a hard coating film having excellent scratch resistance, adhesion, and abrasion resistance may be manufactured. Further, coating properties may be optionally balanced between hardness and flexibility using the organic-inorganic silica particles.

In the organic-inorganic silica particles, the hydroxyl group and the initiator may be chemically bonded to each other via an alkoxy silane compound including an epoxy group.

More specifically, the initiator may be chemically bonded to the hydroxyl group on the surfaces of the silica particles by introducing an epoxy group into the hydroxyl group on the surfaces of the silica particles and then reacting the initiator with the epoxy group. The hydroxyl group of the silica particles and the epoxy group may be bonded by hydrolyzing the alkoxy silane compound containing the epoxy group and introducing the epoxy group into the hydroxyl group of the silica particles by condensation sol-gel reaction. Then, the epoxy group introduced into the silica and the initiator may be bonded by nucleophilic substitution of a carboxyl group (COOH) of the initiator and the epoxy group on the silica surface in the presence of a basic catalyst.

Examples of the alkoxy silane compound may include, without being limited to, glycidoxypropyltrimethoxysilane, 3,4-epoxycyclohexylethyltrimethoxy silane, glycidoxy propyldiethoxysilane, and glycidoxy propyltriethoxysilane.

In the organic-inorganic silica particles according to the present invention, the silica particles may be, without being particularly limited to, a colloidal silica sol dispersed in an organic solvent.

Examples of the organic solvent may include ketones, such as methyl ethyl ketone and methyl isobutyl ketone, and alcohols, such as isopropanol and methanol.

Commercially available products of the colloidal silica sol may include methyl ethyl ketone silica sol (MEK-ST, Average particle size: 22 nm, Silica content: 30%, manufactured by Nissan Chemical Industries, Ltd.), silica powder particles (AEROSIL TT600, Average particle size: 40 nm, manufactured by AEROSIL Co.), methyl isobutyl ketone silica sol (MIBK-ST, Average particle size: 22 nm, Silica content: 30%, manufactured by Nissan Chemical Industries, Ltd.), isopropanol silica sol (IPA-ST, Average particle size: 22 nm, Silica content: 30%, manufactured by Nissan Chemical Industries, Ltd.), etc.

The colloidal silica particles may have an average diameter of 10 to 100 nm, without being particularly limited.

The hydroxyl group on the surfaces of the silica particles may be a hydroxyl group intrinsically existing on the surfaces of the silica particles or a hydroxyl group introduced by substitution of metal salts ($Na^+$, etc.) on the surfaces of the silica particles with ammonium salt having a hydroxyl group (talc, $N(CH_3)_2H^+CH_2CH_2OH$, etc.).

The initiator may include a photoinitiator, a thermal initiator, etc., and examples thereof may include azo compounds.

Examples of the azo compounds may include, without being limited to, azobis cyano pentanoic acid, 2,2'-azobis (2-methylpropionamidine) dihydrochloride, 2,2'-azobis[N-(2-carboxyethyl)-2-methyl-propionamidine]tetrahydrate, and the like.

When the organic-inorganic silica particles in which an azo compound is introduced into the hydroxyl group on the surfaces of the silica particles are UV- or heat-cured, the azo group are decomposed into radicals, thereby functioning as a photoinitiator or thermal initiator. These radicals may chemically bond a reactive group of a polymer used as the binder resin to silica and finally graft the polymer onto the silica particles.

Further, when a polymer is polymerized using the organic-inorganic silica particles in which the azo compound is introduced into the hydroxyl group on the surfaces of the silica particles, the organic-inorganic silica particles themselves may function as an initiator to cause polymerization on the surfaces of the silica particles.

The organic-inorganic silica particles may have a particle size of 20 nm to 20 μm.

Further, the organic-inorganic silica particles may include 50 to 80 wt % of silica, 10 to 20 wt % of an alkoxy silane compound, and 10 to 30 wt % of the initiator, without being limited thereto.

The present invention also provides a method of preparing organic-inorganic silica particles which includes sol-gel reacting an alkoxy silane compound with a hydroxyl group on the surfaces of the silica particles to introduce an epoxy group into the silica particles; and reacting an initiator with the epoxy group of the silica particles.

In the method of preparing organic-inorganic silica particles, the alkoxy silane compound may include, without being limited to, glycidoxypropyl trimethoxysilane, 3,4-epoxycyclohexylethyltrimethoxysilane, glycidoxypropyl diethoxysilane, and glycidoxypropyltriethoxysilane.

In the method of preparing organic-inorganic silica particles, the epoxy group of the silica particles is reacted with an acid group of the initiator, thereby introducing the initiator into the surfaces of the silica particles.

In the method of preparing organic-inorganic silica particles, the sol-gel reaction of the alkoxy silane compound with the hydroxyl group may be performed at 25 to 50° C. for 18 to 24 hours. Further, the reaction of the initiator with the epoxy group may be performed at 25 to 50° C. for 5 to 8 hours in the presence of a basic catalyst, such as α-picoline, pyridine, etc.

In the organic-inorganic silica particles produced by the method according to the present invention, an initiator is chemically bonded to a hydroxyl group on the surfaces of the silica particles.

The present invention also provides a hard coating composition containing the organic-inorganic silica particles.

The hard coating composition may further include at least one selected from the group consisting of an acrylate polymer, a multifunctional acrylate monomer, an isocyanate compound, an initiator, and a solvent.

The acrylate polymer may be an acryloyl functional group-introduced acrylate copolymer and may be UV-cured or heat-cured with the organic-inorganic silica particles in the hard coating composition.

The acryloyl functional group-introduced acrylate copolymer may include any acrylate polymer having an introduced acryloyl functional group. For example, the acryloyl functional group-introduced acrylate copolymer may be prepared by preparing an acrylate copolymer including epoxy functional groups and reacting part of the epoxy functional groups of the copolymer with an acrylic acid monomer to provide an acryloyl functional group. The acrylate copolymer including epoxy functional groups may be prepared by polymerizing an acrylate monomer and an acrylate monomer having an epoxy group.

The acrylate polymer may be added in an amount of 20 to 50 parts by weight based on 100 parts by weight of the hard coating composition.

The multifunctional acrylate monomer refers to a monomer having at least two acrylate functional groups and is not limited to particular monomers. Examples of the multifunctional acrylate monomer may include trimethylolpropane triacrylate, pentaerythritol triacrylate, pentaerythritol tetraacrylate, dipentaerythritol hexaacrylate, and the like.

The multifunctional acrylate monomer may be present in an amount of 10 to 40 parts by weight based on 100 parts by weight of the hard coating composition.

The isocyanate compound may include a multifunctional isocyanate compound having at least two isocyanate groups, for example, methylene diisocyanate (MDI), hexamethylene diisocyanate (HDI), and isophorone diisocyanate (IPDI).

The isocyanate compound may be present in an amount of 0.1 to 3 parts by weight based on 100 parts by weight of the acrylate polymer.

The initiator may be a UV initiator. Any UV initiator generally used in the art may be used, for example, Irgacure 184, Irgacure 819, Iragacure 907, and Vicure 30.

The initiator may be present in an amount of 1 to 5 parts by weight based on 100 parts by weight of the acrylate polymer.

The solvent may include any generally known solvent in the art, without being particularly limited.

The hard coating composition according to the present invention may further include other additives.

The present invention also provides a hard coating film containing the organic-inorganic silica particles. The hard coating film may have a thickness of 3 to 7 μm, without being limited thereto.

The hard coating film may be an in-mold decorative film, without being limited thereto.

The in-mold decoration coating film is placed in a mold and injection-molded together with resin at high temperature and high pressure, and then is decorated while being attached to an upper surface of the resin. The in-mold decoration coating film may have various patterns and colors printed thereon.

More specifically, the in-mold decoration coating film may be prepared by hard-coating a release-coated PET film with the hard coating composition including the organic-inorganic silica particles, followed by printing, deposition, and washing, and then coating with an adhesive layer.

In addition, the present invention also provides a molded article including the hard coating film.

The molded article may be manufactured by any generally known method in the art in addition to using the hard coating film according to the present invention.

The molded article may be an automobile interior material, a mobile phone case, a notebook case, a cosmetic container, etc., without being limited thereto.

Next, the present invention will be explained in more detail with reference to the following examples and comparative examples. These examples are provided for illustrative purposes only and are not to be in any way construed as limiting the present invention.

EXAMPLES

Example 1

(1) Preparation of Glycidoxyalkoxysilane-Silica (Introduction of Glycidoxysilane to Surface of Silica Through Sol-Gel Reaction)

As a commercially available product colloidal silica sol, methyl ethyl ketone silica sol (MEK-ST, Average particle size: 22 nm, Silica content: 30%, manufactured by Nissan Chemical Industries, Ltd.) was used. 20 g of MEK-ST was diluted with 18 g of methyl ethyl ketone (MEK), and 453.6 mg of water was added to the solution, followed by pH adjustment to 8 to 9 using α-picoline as a base. 1.98 g of glycidoxypropyltrimethoxysilane (GPTMS) was added to the solution and stirred at 50° C. for 24 hours.

(2) Preparation of Azo-Silica (Introduction of Azo Initiator to GPTMS-Silica)

1.9 g of azo-bis cyano pentanoic acid (ACPA, Wako Chemicals) was added to the solution prepared in (1) and stirred at 50° C. for 5 hours.

The solution was vacuum-dried at room temperature to obtain azo-silica, which was identified through FT-IR analysis and is shown in FIG. 1.

As a carbonyl group (C=O) of the azo initiator was grafted to silica, a peak shifted. That is, carbonyl in an acid structure was changed into carbonyl in an ester structure, which confirmed that azo-silica was synthesized.

(3) Preparation of Hard Coating Solution 0.5 g of the surface-treated azo-silica prepared in (2), 5 g of polyacrylate polyol, and 0.6 g of a hexamethylene diisocyanate trimer (HDT) were mixed to prepare a hard coating composition.

(4) Preparation of Hard Coating Film

After releasing coating was performed to a thickness of 3 to 5 μm on a PET film, the PET film was hard-coated to a thickness of 3 to 7 μm with the hard coating composition of (3), followed by primary UV curing at 40 to 70 mJ. Then, a primer layer was formed thereon to a thickness of 1 to 3 μm and heat-cured at 80° C. for 30 seconds. Then, a print layer was formed thereon to a thickness of 1 to 3 μm and heat-cured at 80° C. for 30 seconds. Another primer layer was formed thereon to a thickness of 1 to 3 μm and heat-cured at 80° C. for 30 seconds. Finally, a hot melt layer was formed thereon to a thickness of 500 nm to 2 μm and heat-cured at 80° C. for 30 seconds, thereby producing an in-mold decorative film.

Example 2

An in-mold decorative film was manufactured in the same manner as in Example 1 except that 1.96 g of gamma-glycidoxypropyldiethoxysilane (GPDES) was used instead of 1.98 g of gamma-glycidoxypropyltrimethoxysilane (GPTMS).

Example 3

An in-mold decorative film was manufactured in the same manner as in Example 1 except that 1.96 g of gamma-glycidoxypropyltriethoxysilane (GPTES) was used instead of 1.98 g of gamma-glycidoxypropyltrimethoxysilane (GPTMS).

Comparative Examples 1

A hard coating solution was prepared in the same manner as in Example 1 except that non-surface-treated silica and a methyl ethyl ketone silica sol (MEK-ST, Average particle size: 22 nm, Silica content: 30%, manufactured by Nissan Chemical Industries, Ltd.) were used, and then an in-mold decorative film was prepared.

<Test>

Pencil hardness of the in-mold decorative films according to Examples 1 to 3 and Comparative Example 1 were measured, and results are illustrated in Table 1.

TABLE 1

|  | Pencil hardness |
|---|---|
| Example 1 | 6H |
| Example 2 | 5H |

TABLE 1-continued

| | Pencil hardness |
|---|---|
| Example 3 | 6H |
| Comparative Example 3 | 4H |

As shown in Table 1, the hard coating compositions containing the organic-inorganic silica particles according to the present invention may provide a hard coating film having excellent scratch resistance and abrasion resistance as compared with a hard coating film for a conventional in-mold decorative film.

The invention claimed is:

1. A hard coating composition used for in-mold decorative film comprising organic-inorganic silica particles useful for preparing hard coating compositions or films; an acryloyl functional group-introduced acrylate copolymer; and an isocyanate compound;
   wherein the acrylate copolymer is added in an amount of 20 to 50 parts by weight based on 100 parts by weight of the hard coating composition,
   wherein the organic-inorganic silica particles comprise hydroxyl (OH) groups on the surfaces thereof, and comprise an initiator chemically bonded to said hydroxyl (OH) groups,
   wherein the hydroxyl groups and the initiator are chemically bonded to each other via an alkoxy silane compound including an epoxy group,
   wherein the organic-inorganic silica particles are composed of 50 to 80 wt % of silica, 10 to 20 wt % of the alkoxy silane compound, and 10 to 30 wt % of the initiator,
   wherein the alkoxy silane compound includes at least one selected from the group consisting of glycidoxy propyldiethoxysilane, and glycidoxy propyltriethoxysilane,
   and wherein the isocyanate compound comprises hexamethylene diisocyanate trimer (HDT), and is present in an amount of 0.1 to 3 parts by weight based on 100 parts by weight of the acrylate copolymer.

2. The hard coating composition of claim 1, wherein the hard coating composition also contains at least one selected from the group consisting of a multifunctional acrylate monomer, an initiator, and a solvent.

3. The hard coating composition of claim 2, wherein the multifunctional acrylate monomer comprises at least one selected from the group consisting of trimethylolpropane triacrylate, pentaerythritol triacrylate, pentaerythritol tetraacrylate, and dipentaerithritol hexaacrylate.

4. A hard coating film used for in-mold decorative film containing the hard coating composition of claim 1, wherein the hard coating film has a thickness of 3 to 7 μm and 5H to 6H pencil hardness.

5. A molded article containing the hard coating film of claim 4.

6. The hard coating composition of claim 1, wherein the initiator in the organic-inorganic silica particles comprises an azo compound.

7. The hard coating composition of claim 6, wherein the azo compound comprises at least one selected from the group consisting of azobis cyano pentanoic acid; 2,2'-azobis (2-methylpropionamidine) dihydrochloride; and 2,2'-azobis [N-(2-carboxyethyl)-2-methyl-propionamidine] tetrahydrate.

8. The hard coating composition of claim 1, wherein the organic-inorganic silica particles have a particle size of 20 nm to 20 μm.

* * * * *